July 22, 1958 W. L. HURFORD 2,844,647

AMPLIFIER-LIMITER CIRCUIT

Filed Feb. 10, 1954 2 Sheets-Sheet 1

Inventor:
Winslow L. Hurford,
by Julius J. Zaskalicky
His Attorney.

July 22, 1958 W. L. HURFORD 2,844,647

AMPLIFIER-LIMITER CIRCUIT

Filed Feb. 10, 1954 2 Sheets-Sheet 2

Inventor:
Winslow L. Hurford,
by Julius J. Zaskalicky
His Attorney.

United States Patent Office 2,844,647

Patented July 22, 1958

2,844,647

AMPLIFIER-LIMITER CIRCUIT

Winslow Leroy Hurford, Oaklynn, N. J., assignor to General Electric Company, a corporation of New York Application February 10, 1954, Serial No. 409,307

7 Claims. (Cl. 178—7.1)

The present invention relates to amplifiers of electric waves, and has as an object thereof to provide an improved amplifier for limiting the excursions of a video signal prior to the application of this signal to a television transmitter.

The limiting amplifier of the present invention is of the type used to control the maximum excursions of a signal varying in amplitude with a minimum of distortion of the portions of the wave exceeding the limiting level. This type of limiter should be distinguished from the limiters which are used to cut off the upper portions of the waves and which find application in frequency modulation. Limiting amplifiers of the class to which the present invention belongs, obtain a uniform reduction in amplification for the upper and lower portions of the signal by subjecting a forward amplifier to control by a feed-back loop circuit. The control voltage in these circuits may be obtained by passing only the portions of the signal exceeding a desired amplitude, amplifying the passed portions and applying them to control the amplification of the forward amplifier.

The difficulty in known circuits has been in obtaining adequate amplification in the feed-back loop to control the amplifier without causing self oscillation in the feed-back loop. The problem is especially acute where the upper portions of the wave are of low energy content and so require a high amplification or where the signal is a wideband signal so that any substantial phase shift arising in the amplifier will tend to make it regenerate at particular frequencies lying within the band. The present invention provides a limiting amplifier which is adapted to provide limiting of a video signal which is both a broad band signal and a signal whose high intensity excursions are usually made by waves of very low energy content.

In a television transmitter, the limiting amplifier functions to stabilize the average degree of modulation when the television camera is shifted from one scene to another or to stabilize the degree of modulation when the transmitter is shifted from one program source to another. Use of the limiting amplifier tends to maintain the modulations at the center of the rather limited dynamic range of the modulation system so as to deliver the most intelligence to the antenna, and ultimately to the receiver.

Accordingly, it is an object of the present invention to provide an improved limiting amplifier.

It is another object of the present invention to provide an improved limiting amplifier of the type employing a feed-back loop, in which the tendency to oscillate is greatly reduced.

It is a further object of the present invention to provide an improved limiting amplifier of the type having a feed-back loop, in which the amplification in the feed-back loop may be greatly increased without danger of self oscillation.

In carrying out the present invention, there is provided a limiting amplifier comprising amplification means, means for supplying a signal thereto having a constantly recurring portion, pulse generating means responsive to the amplification means and adjusted to be responsive when portions of the signal have an amplitude in excess of a predetermined value to initiate a pulse, means responsive to the constantly recurring portion of the signal to terminate the pulse within a predetermined interval, integrating means connected to the output of the pulse generating means for obtaining a control signal from the pulses, and means for applying said control signal to said amplification means to limit the amplitude of the amplified signal.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawings in which:

Figure 1:
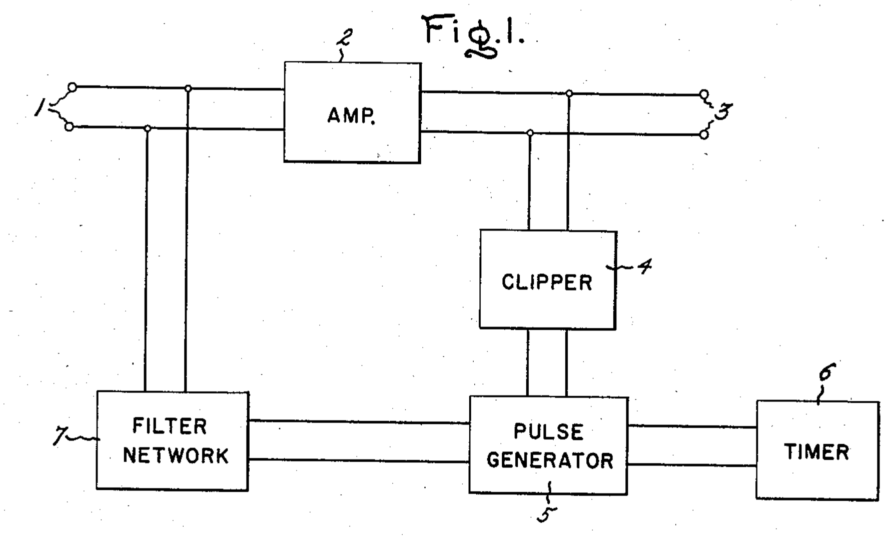
Figure 1 is a simplified block diagram illustrative of the invention.

Referring now to Figure 1, a limiting amplifier illustrative of the invention is shown having input terminals 1 coupled to amplification means 2. Signals applied to the input of the amplification means 2 appear in the output thereof, and are passed both to the output terminals 3 of the limiting amplifier and to a gain controlling loop circuit whose first component is a clipper 4. The clipper 4, which is coupled to a pulse generator 5, is adjusted to pass only those portions of the applied signals exceeding a predetermined amplitude to the pulse generator 5. These portions of the signal are employed to trigger the pulse generator 5 thereby initiating a rectangular pulse of relatively large energy content. The pulse continues until a timer 6, also connected to control the pulse generator 5, terminates the pulse within and arbitrary interval. The rectangular pulses so produced by the pulse generator 5 are filtered by the filter network 7 so as to transform them into a slowly varying direct current control voltage. This control voltage is then applied to control the gain of the amplifier in a manner to reduce the output voltage of the limiting amplifier to the predetermined voltage at which the clipper is set.

The clipped portions of the signals are usually of relatively low energy content and their transformation into rectangular pulses affects a substantial amplification of their energy content. Substantial filtering of the relatively long duration rectangular pulses and direct application of the filtered resultant waves to control the gain of the amplification means eliminates the possibility of regeneration or "motorboating" to which other feed-back limiters are subject and is a simple and effective way to control the amplifier gain.

Figure 2:
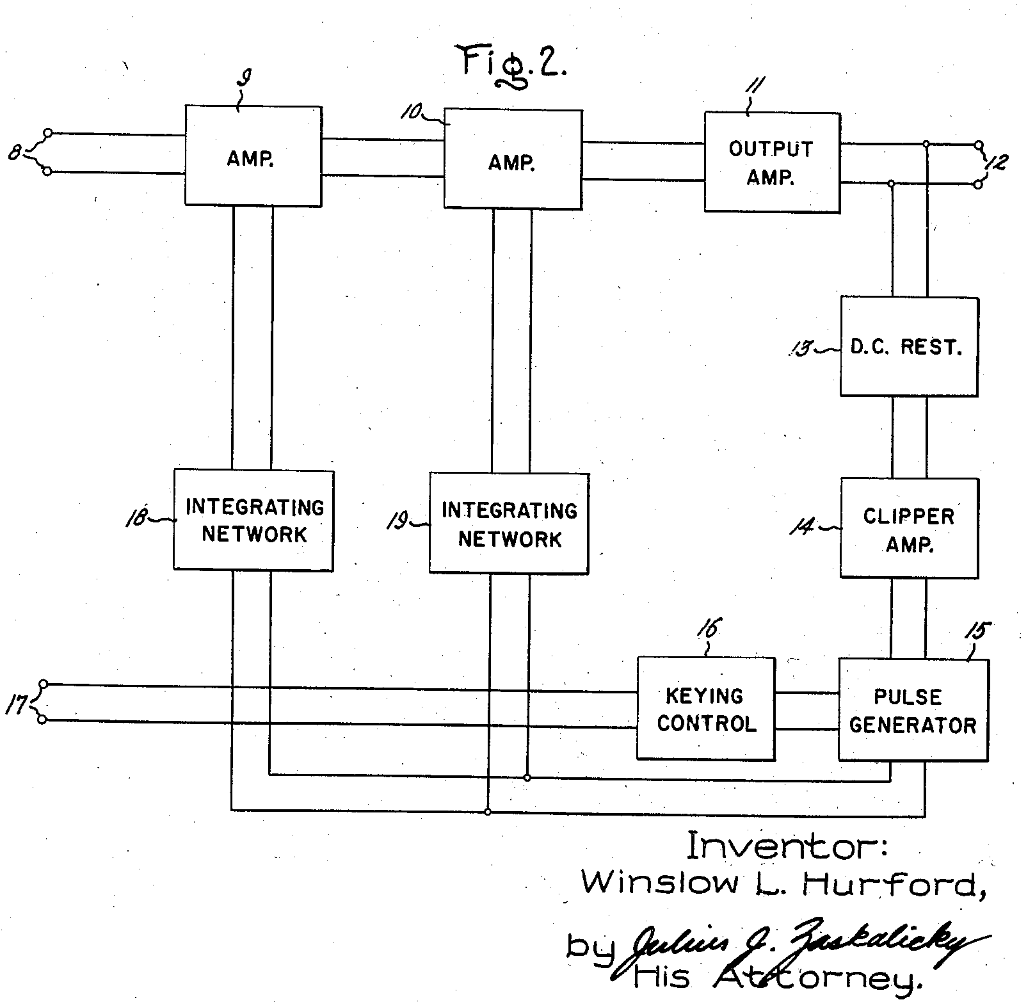
Figure 2 is a simplified block diagram of a limiting amplifier for use in a television transmitter embodying the invention.
Figure 3:
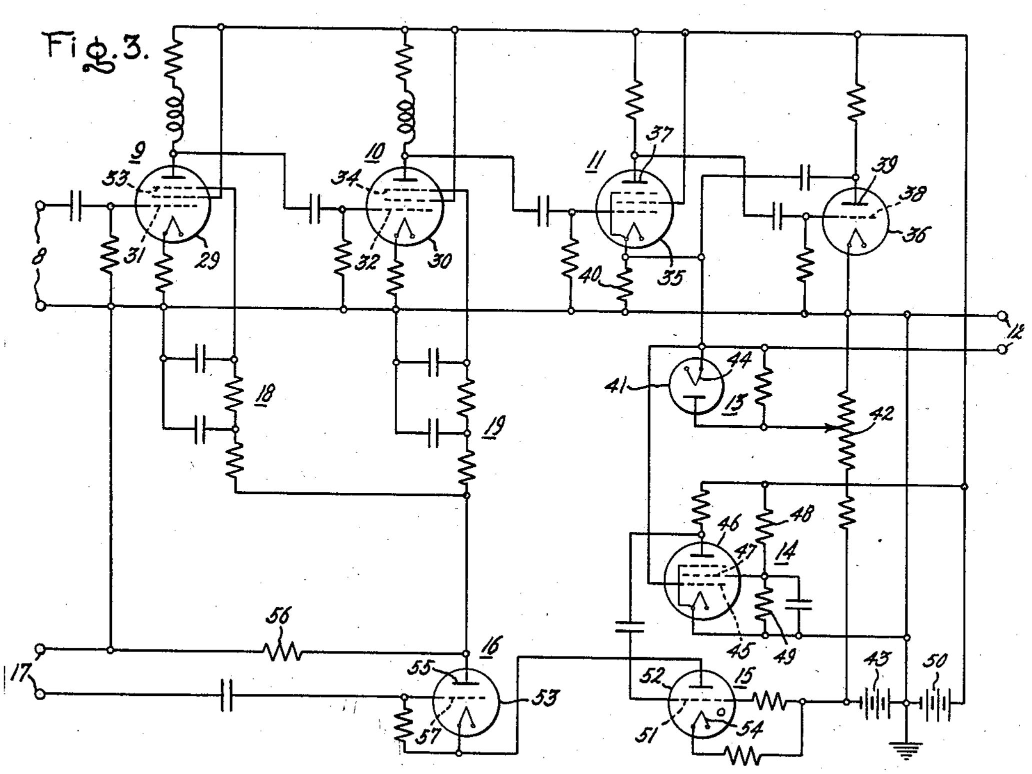
Figure 3 is a simplified schematic diagram of the embodiment of the invention illustrated in Figure 2.

Figures 2, 3, and 4 refer to an embodiment of the invention for use in limiting the video signal in a television transmitter prior to the modulation of the transmitter therewith. Figure 2 is a block diagram containing the principal elements of a limiting amplifier more completley illustrated schematically in Figure 3, while Figure 4 illustrates the nature of the voltages appearing at successive stages in the limiting amplifier.

In Figure 2 there is shown a limiting amplifier having input terminals 8 connected to the first of three video amplification stages 9, 10, and 11 connected in cascade in the order recited. The output of the final amplification stage 11 is connected to the output terminals 12 of the limiting amplifier and to the direct current restorer 13. The output of the direct current restorer 13 is connected to clipper amplifier 14 whose output is connected to the control input of the pulse generator 15. Also connected to the control input of the pulse generator 15 is a keying control 16 whose input is coupled to terminals 17 for connection to a source of timing signals. The output of the pulse generator 15 is connected to integrating networks 18 and 19 which are coupled respectively to amplification stages 9 and 10.

Figures 4A, 4B, 4C, 4D, 4E:
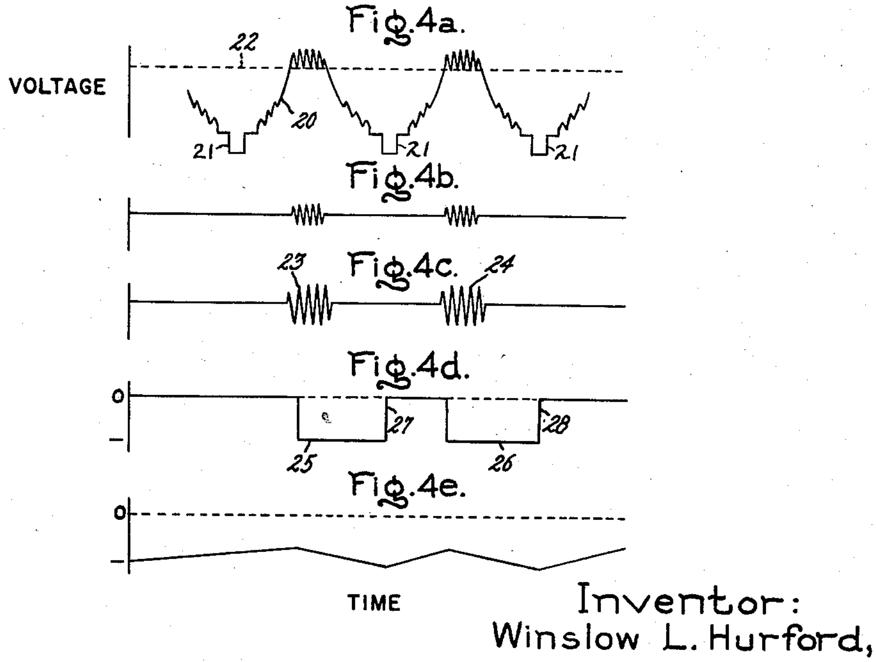
Figures 4*a*, 4*b*, 4*c*, 4*d*, and 4*e* are explanatory diagrams having reference to the embodiment of the invention illustrated in Figures 2 and 3.

Considering now the operation of the limiting amplifier, reference may be made to Figures 4*a*, 4*b*, 4*c*, 4*d*, and 4*e* showing the voltages of various wave shapes occurring within the limiting amplifier plotted along a common horizontal time axis. Figure 4*a* illustrates the general nature of the video signals applied at the input terminals 8. The video signals 20 are shown having their white intensities at the upper portion of the curve and having superimposed synchronizing pulses 21 extending downward toward the darker than dark portions of the video signal. These signals are applied successively to amplification stages 9 and 10 and finally, after passage through the output amplification stage 11, these signals appear at the output terminals 12 of the limiting amplifier substantially unchanged except in amplitude. The signals appearing in the output amplification stage 11 are applied to the direct current restorer 13. The effect of the direct current restorer 13 is to bring each portion of the video signal into its proper correspondence to ground potential prior to clipping or transmission to the output terminals 12. Figure 4*a* illustrates the nature of the signal prior to clipping in the clipper amplifier 14, the clipping level being set at 22 and having a value chosen to approximate the desired maximum intensity video modulation. After clipping, the signals appearing in the output of the clipper amplifier 14 are "spike"-shaped waves of relatively low energy content. They are shown in Figure 4*b* having a shape like the original peaks of the wave from which they were clipped. The clipped and amplified signals are applied to the pulse generator 15 to initiate conduction therein. These signals have a wave formation as shown at 23 and 24 in Figure 4*c*. The pulse generator 15 develops negative pulses shown at 25 and 26 in Figure 4*d* initiated at the same time position as the commencements of the corresponding "spike" waves 23 and 24. The pulse generator 15 is also controlled by timing signals applied at terminals 17 to the keying control 16. The timing signals may be synchronizing pulses of the kind shown at 21 in Figure 4*a*. If such timing pulses are employed, the generated pulse is terminated as shown at 27 and 28 when the synchronizing pulses occur. The generated negative pulses produced in this manner are then filtered so as to remove any but the most gradual changes in voltage and are applied to control the amplification of the amplification stages 9 and 10. The final filtered control voltage is shown in Figure 4*e*. The control voltage illustrated is of a negative polarity and is applied to reduce the gain of the amplification stages 9 and 10. It should be noted that during the occurrence of a negative pulse the control voltage becomes gradually more negative, while during the occurrence of a quiescent period the control voltage becomes gradually more positive.

The schematic diagram for this latter embodiment is shown in Figure 3. The first two stages of amplification are provided by two pentode type discharge devices 29 and 30, the signals being applied to their control grids 31 and 32 respectively. The control voltage is separately supplied to the third or suppressor grids 33 and 34 respectively. The output amplification stage 11 includes two discharge devices 35 and 36, the first being of a pentode type having its anode 37 connected to the grid 38 of the second, a triode, whose anode 39 is connected in degenerative phase to a cathode resistor 40 of the discharge device 35. The output of amplification stage 11 appearing at the anode 39 of the triode discharge device 36 is then applied to the direct current restorer 13 comprising a diode 41 and a variable resistance 42 connected with a suitable source 43 of a negative direct current potential for controlling the point at which the diode 41 conducts to establish restoration. The output of the limiting amplifier may be taken from the cathode 44 to the diode 41. A portion of the output signal is then applied to the control grid 45 of a further pentode discharge device 46 of the clipper amplifier 14. The screen grid 47 is supplied with a relatively low direct current potential from a voltage divider comprising resistance 48 and 49 serially connected across a source 50 of direct current energizing potentials. Reduction in the screen potential gives the discharge device 46 a relative sharp "cut-off" and facilitates clipping of the portions of the signals applied to the control grid 45 which exceed the clipping level selected by the variable resistance 42. The portions of the signal which exceed the clipping level are further amplified by the discharge device 46 and then applied to the grid 51 of a grid controlled gaseous discharge device 52 serving as the pulse generator 15. The keying control is provided by a triode discharge device 53 whose discharge path is in series with the discharge path of the gaseous discharge device 52, the latter having its cathode 54 connected to the source 43 of negative voltage so that the anode 55 of the keying control discharge device 53, whose load resistance 56 is grounded, will always produce a negative voltage with respect to ground. The application of synchronizing pulses to the grid 57 of the keying control discharge device 53 when the gaseous discharge device 52 is conducting reduces the conductivity of the keying control discharge device 53 so greatly that the anode potential of the gaseous discharge device 52 drops below extinction potential and the pulse is terminated. The pulses appear at the anode 55 of the triode discharge device 53 and are applied to integrating networks 18 and 19 which comprise two section low pass RC filter networks. The constants of these filter networks are chosen to provide substantial smoothing of the pulses. The final filtered voltage of negative polarity is then applied to the suppressor grids 33 and 34 of the first two pentode discharge devices 29 and 30 to control the gain thereof in the manner set forth above.

In the embodiment discussed, the duration of the pulse is conveniently controlled in a television system by use of a recurrent synchronizing pulse, preferably the horizontal synchronizing pulse. This arrangement limits the pulse duration to a value not exceeding the duration between horizontal pulses. The fact that the pulses may be of slightly different duration has little noticeable effect on the operation of the system since the gain in the feedback circuit, which might be reduced somewhat for shorter duration pulses than for longer duration pulses, is relatively high. The termination of the pulse need not be limited to the method shown here, but an arrangement may be employed using pulses of fixed duration. The pulse duration in all such arrangements should be short relative to the filtering capabilities of the filters, and the decay time of the filter should be chosen to be short enough to give the desired rapidity of limiting.

In applying the invention to other modes of limiting, as for limiting an ordinary alternating current wave of changing intensity, the clipping may take a number of forms. If the signal may be assumed to be symmetrical with respect to ground potential, clipping of excursions of one polarity of the signal as illustrated will be adequate.

While particular embodiments of the invention have been shown, it will of course be understood that the invention should not be limited thereto, since many modifications may be made both in the circuit arrangement and in the instrumentalities employed. It is therefore contemplated by the appended claims to cover any such modifications as fall within the true spirit and scope of the invention.

What I claim as new and desire to secure by Letters Patent of the United States is:

1. A limiting amplifier for video signals containing synchronizing pulses which occur periodically having a polarity corresponding to the black portion of said video signal comprising amplification means, means for supplying said video signal thereto, clipping means connected to the output of said amplification means having its clipping level adjusted to pass portions of an applied signal in the white direction, only when said applied signal is to be limited, pulse generating means responsive to signals appearing in the output of said clipping means to initiate a pulse, means responsive to the first occurrence of a synchronizing pulse of said video signal after said generated pulse is initiated to terminate said initiated pulse, filtering means connected to said pulse generating means and responsive to said generated pulse for obtaining a smooth control voltage therefrom, and means for applying said control voltage to said amplification means in a polarity to limit the maximum voltage of the white excursions of said video signal.

2. A limiting amplifier for video signals containing periodically occurring synchronizing pulses having a polarity corresponding to the black portion of said video signal comprising amplification means, means for supplying said video signal thereto, clipping means connected to the output of said amplification means having its clipping level adjusted to a predetermined voltage to produce a signal only when the amplitude of said amplified video signal is to be limited, pulse generating means responsive to signals appearing in the output of said clipping means to initiate a pulse, means responsive to the first occurrence of a synchronizing pulse after the initiation of the generation of said initiated pulse to terminate said initiated pulse, filtering means connected to said pulse generating means for obtaining a smooth control voltage therefrom, and means for applying said control voltage to said amplification means in a polarity to limit the maximum voltage of the white excursions of said video signal.

3. A limiting amplifier comprising amplification means, means for supplying a video signal thereto containing regularly spaced pulses having a polarity corresponding to the black portion of said video signal, clipping means connected to the output of said amplification means to pass a portion of the amplified video signal only when said amplified video signal is to be limited, said latter means thereby being adjusted to pass only the white portions of said video signal having a predetermined voltage in excess of the potentials of said regularly spaced pulses, pulse generating means connected to the output of said clipping means responsive to a signal voltage in the output thereof to initiate a pulse, means for teminating said initiated pulse in response to the first occurrence of one of said regularly spaced pulses after the generation of said initiated pulse is generated, filtering means connected to the output of said pulse generating means having a time constant large enough to smooth said pulses and produce a relatively smooth control voltage therefrom, and means for supplying said control voltage to said amplification means in such polarity as to maintain the maximum voltage of the white excursions of said video signal at said predetermined voltage and thereby limit said video signal.

4. A limiting amplifier comprising amplification means, means for supplying a video signal thereto containing regularly spaced pulses having a polarity corresponding to the black portions of said video signal, clipping means connected to the output of said amplification means adjusted to pass only the white portions of said video signal which exceed the potential of said regularly spaced pulses by a predetermined voltage, pulse generating means comprising a vacuum discharge device having a control element and a gas discharge device having a control element, means connecting said vacuum discharge device and said gas discharge device in circuit relation, said first recited control element being coupled to the output of said clipping means and responsive to a signal voltage appearing in the output thereof to initiate a pulse, means for coupling to said second control element said regularly spaced pulses for terminating said initiated pulse, filtering means connected to the output of said pulse generating means having a time constant large enough to smooth said initiated pulses and produce a relatively smooth control voltage therefrom, and means for supplying said control voltage to said amplification means in such polarity as to maintain the maximum voltage of the white excursion of said video signal at said predetermined voltage.

5. In a signal amplifying system for amplifying a signal having a constantly recurring portion, apparatus for limiting the amplitude of said amplified signal comprising means responsive to said amplified signal to produce a first control signal only when the amplitude of said amplified signal is to be limited, pulse generating means responsive to said first control signal to initiate the generation of a pulse, pulse termination means responsive to the first occurrence of said constantly recurring portion of said amplified signal after said generated pulse is initiated to terminate said generated pulse, integrating means responsive to said generated pulse to integrate said generated pulse to produce a second control signal, and means responsive to said second control signal to limit the amplitude of said amplified signal.

6. In a signal amplifying system for amplifying a signal having a constantly recurring portion of a given polarity, apparatus for limiting the amplitude of said amplified signal comprising means responsive to said amplified signal to produce a first control signal only when the amplitude of the portion of said amplified signal having a polarity opposite that of said given polarity is to be limited, pulse generating means responsive to said first control signal to initiate the generation of a pulse, pulse termination means responsive to the first occurrence of said constantly recurring portion of said amplified signal of said given polarity after said generated pulse is initiated to terminate said generated pulse, integrating means responsive to said generated pulse to integrate said generated pulse to produce a second control signal, and means responsive to said second control signal to limit the amplitude of said amplified signal.

7. In a video signal amplifying system for amplifying a video signal having a constantly recurring synchronizing pulse, apparatus for limiting the amplitude of said amplified video signal comprising means responsive to said amplified video signal to produce a first control signal only when the amplitude of said amplified video signal is to be limited, pulse generating means responsive to said first control signal to initiate the generation of a pulse, pulse termination means responsive to the first occurrence of said synchronizing pulse of said amplified video signal after said generated pulse is initiated to terminate said generated pulse, integrating means responsive to said generated pulse to integrate said generated pulse to produce a second control signal, and means responsive to said second control signal to limit the amplitude of said amplified video signal.

References Cited in the file of this patent

UNITED STATES PATENTS

| | | |
|---|---|---|
| 2,307,375 | Blumlein | Jan. 5, 1943 |
| 2,446,229 | Goldberg | Apr. 5, 1949 |
| 2,498,659 | La Rosa | Feb. 28, 1950 |
| 2,519,359 | Dean | Aug. 22, 1950 |
| 2,725,557 | Hellings | Nov. 29, 1955 |